United States Patent
Aoshima

(10) Patent No.: US 10,807,202 B2
(45) Date of Patent: Oct. 20, 2020

(54) CU—NI—SN BASED COPPER ALLOY FOIL, COPPER ROLLED PRODUCT, ELECTRONIC DEVICE PARTS AND AUTOFOCUS CAMERA MODULE

(71) Applicant: JX Nippon Mining & Metals Corporation, Tokyo (JP)

(72) Inventor: Kazutaka Aoshima, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 213 days.

(21) Appl. No.: 16/149,270

(22) Filed: Oct. 2, 2018

(65) Prior Publication Data

US 2019/0099843 A1 Apr. 4, 2019

(30) Foreign Application Priority Data

Oct. 3, 2017 (JP) .................. 2017-193695

(51) Int. Cl.
| | |
|---|---|
| *B23K 35/30* | (2006.01) |
| *B23K 35/02* | (2006.01) |
| *G02B 7/09* | (2006.01) |
| *C22C 9/02* | (2006.01) |
| *G03B 13/36* | (2006.01) |
| *B23K 101/36* | (2006.01) |

(52) U.S. Cl.
CPC ........ *B23K 35/302* (2013.01); *B23K 35/0233* (2013.01); *C22C 9/02* (2013.01); *G02B 7/09* (2013.01); *B23K 2101/36* (2018.08); *G03B 13/36* (2013.01)

(58) Field of Classification Search
CPC .... B23K 35/302; B23K 35/0233; C22C 9/02; C22F 1/08; G02B 7/09
See application file for complete search history.

(56) References Cited

U.S. PATENT DOCUMENTS

2014/0261925 A1 9/2014 Wetzel et al.
2015/0170781 A1 6/2015 Ito et al.

FOREIGN PATENT DOCUMENTS

| JP | S56-265 A | 1/1981 |
|---|---|---|
| JP | 63-266055 | 11/1988 |
| JP | 5839126 | 1/2016 |
| JP | 2016516897 A | 6/2016 |
| TW | 2014-10886 A | 3/2014 |

OTHER PUBLICATIONS

Office Action in TW Application No. 107134343 dated Dec. 28, 2018, 5 pages.

*Primary Examiner* — Jessee R Roe

(74) *Attorney, Agent, or Firm* — Marshall, Gerstein & Borun LLP

(57) ABSTRACT

Provided is a thinner Cu—Ni—Sn based copper alloy foil that has a foil thickness of 0.1 mm or less, has improved solder wettability and improved solder adhesion strength, and can be suitably used as a conductive spring material for use in electronic device parts such as autofocus camera modules; a copper rolled product; an electronic device part; and an autofocus camera module. The Cu—Ni—Sn based copper alloy foil according to one embodiment of the present invention has a foil thickness of 0.1 mm or less; and contains from 14% by mass to 22% by mass of Ni, from 4% by mass to 10% by mass of Sn, the balance being copper and inevitable impurities; and has a 60-degrees glossiness $G60_{RD}$ of from 200 to 600 on a surface as measured in a direction parallel to a rolling direction.

7 Claims, 4 Drawing Sheets

[FIG. 1]
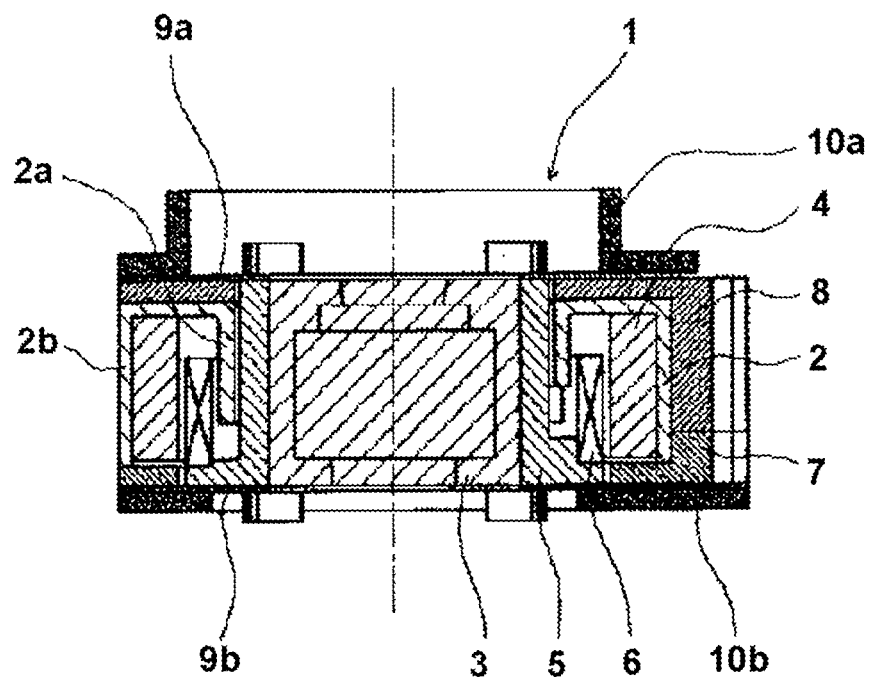

[FIG. 2]
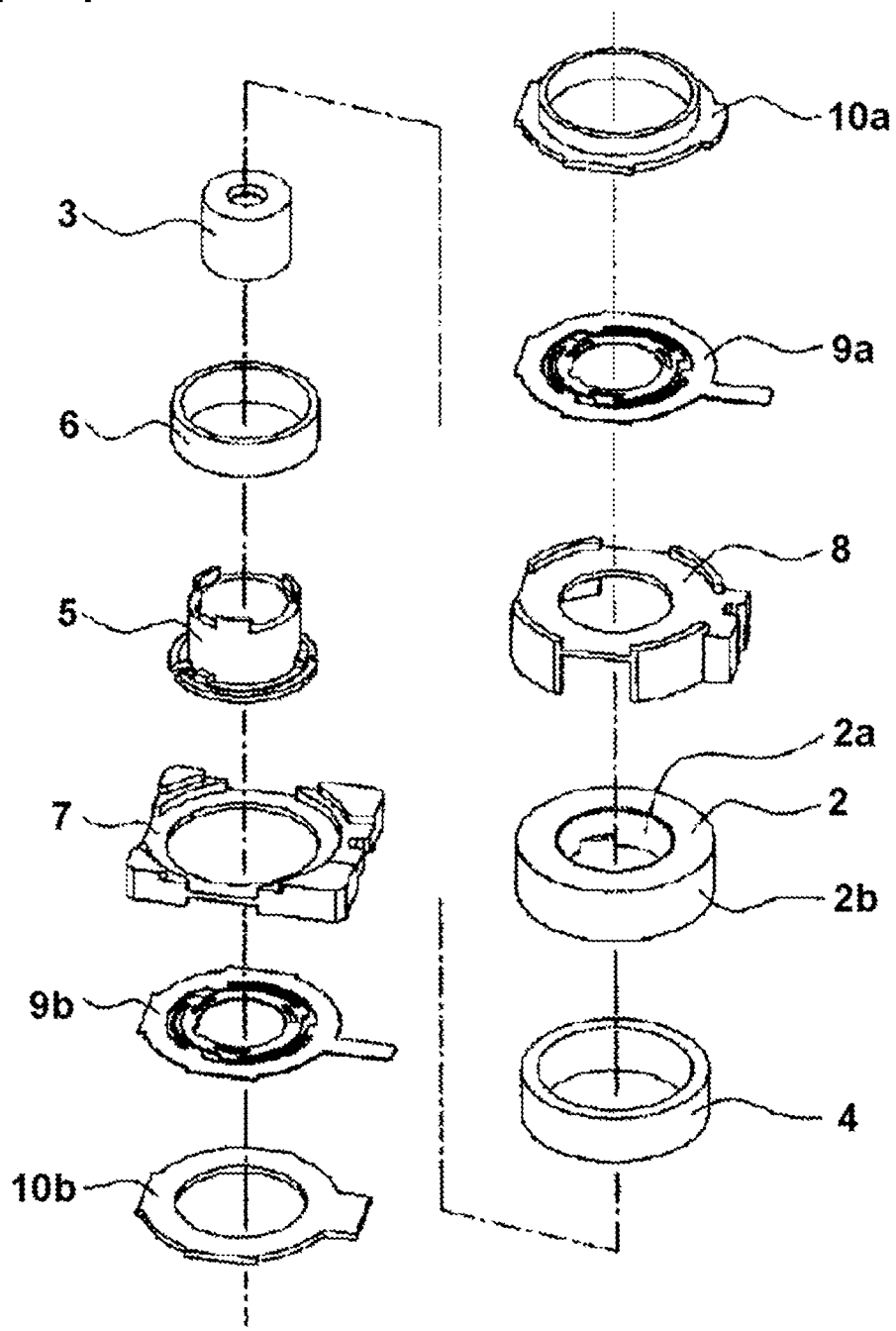

[FIG. 3]
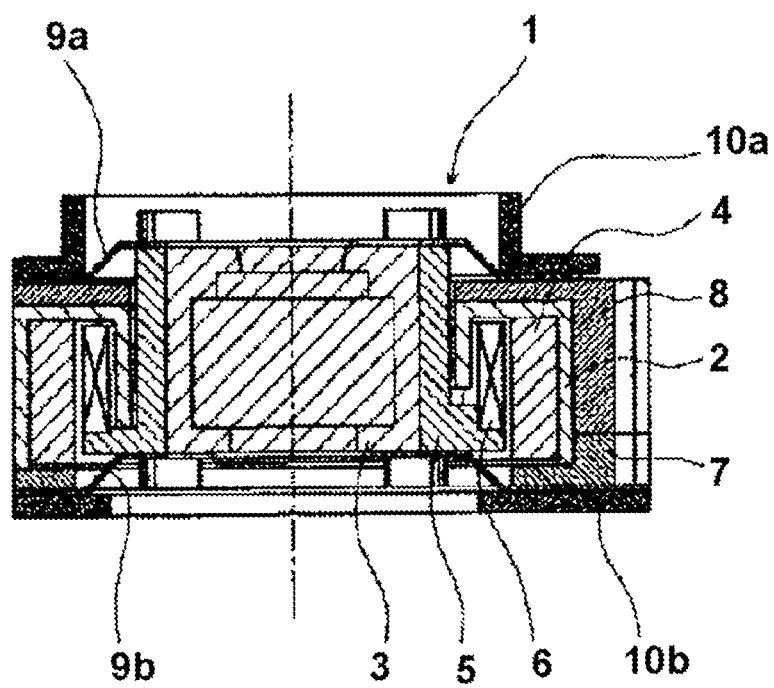

[FIG. 4]
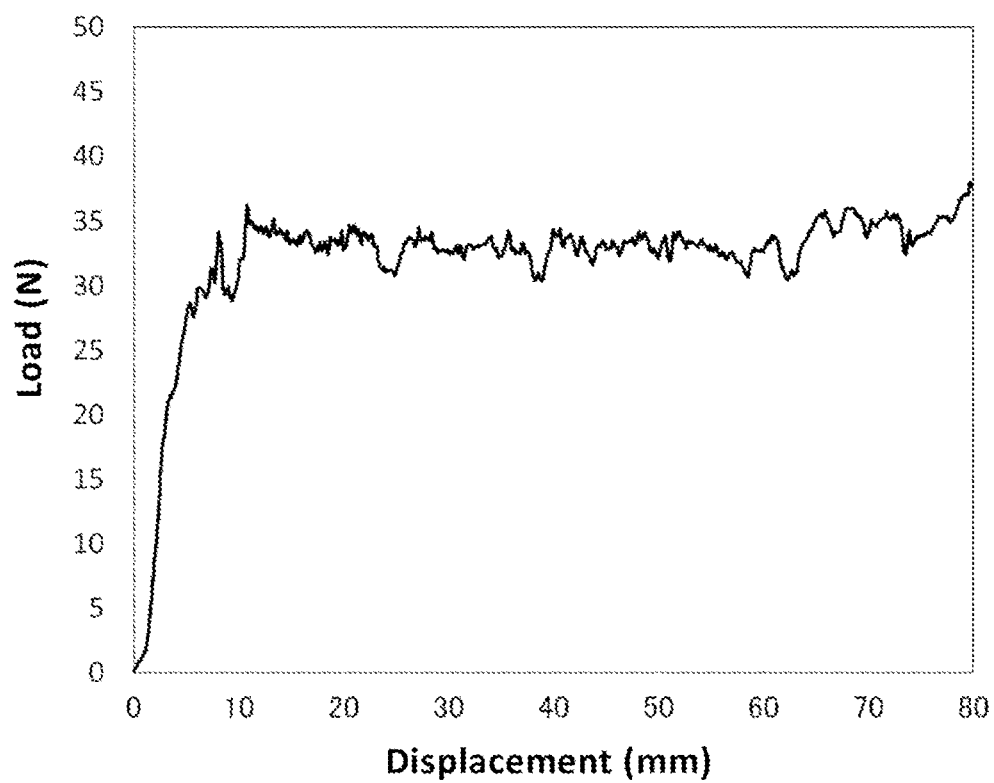

CU—NI—SN BASED COPPER ALLOY FOIL, COPPER ROLLED PRODUCT, ELECTRONIC DEVICE PARTS AND AUTOFOCUS CAMERA MODULE

TECHNICAL FIELD

The present invention relates to a Cu—Ni—Sn based copper alloy foil, a copper rolled product, an electronic device part and an autofocus camera module. More particularly, the present invention relates to a Cu—Ni—Sn based copper alloy foil that has good solderability suitable for use in a conductive spring material of an autofocus camera module and the like.

BACKGROUND ART

An electronic part called an autofocus camera module is used in camera lens sections for mobile phones. An autofocus function of a camera for a mobile phone moves a lens in a fixed direction by spring force of a material used for an autofocus camera module, while moving the lens in a direction opposite to the spring force-acting direction by means of electromagnetic force generated by passing an electric current through a coil wound around the periphery. By such a mechanism, the camera lens is driven to exert the autofocus function.

For the autofocus camera modules, Cu—Ni—Be based copper alloy foils have been used. However, since beryllium compounds are harmful, the use of them has tended to be avoided in terms of environmental regulation. Further, a recent demand for cost reduction has led to the use of Cu—Ni—Sn based copper alloy foils which have relatively lower raw material costs than the Cu—Be based copper alloys, and the demand for the Cu—Ni—Sn based copper alloy foils is thus increasing.

For such Cu—Ni—Sn based copper alloy foils, for example, Patent Document 1 focuses on improvement of yield strength characteristics of the alloy. To solve the problem, Patent Document 1 proposes to produce "the desired formability characteristics" through "a thermal stress relief step by heating to an elevated temperature between about 740° F. and about 850° F. for a period of between about 3 minutes and about 14 minutes".

Further, for example, Patent Document 2 focuses on a problem of fatigue characteristics and teaches that the fatigue characteristics are improved by adjusting the structure of a precipitate.

Meanwhile, the Cu—Ni—Sn based copper alloy contains Ni and Sn which are extremely active and easily oxidizable, thereby forming a strong oxide film in an aging treatment that is a final step. Such a strong oxide film significantly deteriorates solderability. Therefore, when a Cu—Ni—Sn based copper alloy having a relatively thick shape, such as Cu—Ni—Sn based copper alloy sheets or strips, is manufactured, chemical polishing (pickling) and further mechanical polishing are generally carried out after the aging treatment to remove the oxide film, as described in Patent Document 3 or the like.

To remove the oxide film formed on the surface of the Cu—Ni—Sn based copper alloy, the chemical polishing is first carried out. The oxide film on the Cu—Ni—Sn based copper alloy containing oxides of Ni and Sn is very stable against an acid. Therefore, the chemical polishing has to use a chemical polishing solution having extremely high corrosive power, such as a solution obtained by mixing hydrogen peroxide with hydrofluoric acid or sulfuric acid.

However, when the chemical polishing solution having such extremely high corrosive power is used, not only the oxide film but also the unoxidized part may be corroded, and uneven irregularities and discoloration may occur on the surface after the chemical polishing. Further, the corrosion does not proceed uniformly, and the oxide film may locally remain. Therefore, to remove the irregularities, discoloration and residual oxide film on the surface, mechanical polishing is carried out using, for example, a buff, after the above chemical polishing.

After the mechanical polishing, a rust preventive treatment is carried out as a final surface treatment to make a sheet or strip product. In the rust prevention treatment, an aqueous solution of benzotriazole (BTA) is generally used, and this also applies to a rust preventive treatment for a Cu—Ni—Sn based copper alloy foil that will be described below.

CITATION LIST

Patent Literatures

Patent Document 1: Japanese Patent Application Publication No. 2016-516897 A

Patent Document 2: Japanese Patent Application Publication No. S63-266055 A

Patent Document 3: Japanese Patent No. 5839126 B

SUMMARY OF INVENTION

Technical Problem

However, for example in a thinner Cu—Ni—Sn based copper alloy foil having a thickness of 0.1 mm or less, it is difficult to perform the mechanical polishing for removing the oxide film formed by the aging treatment to improve solderability, in contrast to the case of the Cu—Ni—Sn based copper alloy sheet or strip. There are two reasons; the first relates to maintenance of foil through a mechanical polishing line, and the second relates to a thickness control in a mechanical polishing line.

With regard to the maintenance of foil through the machine polishing line which is the first reason, when a buff is used, the buff is caught by the Cu—Ni—Sn based copper alloy foil as a buff roll is rotated, and the Cu—Ni—Sn based copper alloy foil may be broken from the caught portion. The buffing is to rotate a cylindrical buff roll around its center axis and to polish the surface of the Cu—Ni—Sn based copper alloy foil. The buff roll is formed by fixing a resin having dispersed abrasive grains (abrasive grains such as SiC) to organic fibers in the form of sponge. Clumps of the resin are caught on an edge with large irregularities of the Cu—Ni—Sn based copper alloy foil, and broken when applying a tensile force exceeding the strength of the Cu—Ni—Sn based copper alloy foil.

With regard to the thickness control in the mechanical polishing line which is the second reason, a rolling load for polishing is applied onto the cylindrical buff roll and a tensile force is applied to the Cu—Ni—Sn based copper alloy foil to maintain the foil through the line. Both the rolling load and the tensile force have more or less periodic vibration components, which vibration is referred to as chattering. Depending on vibration cycles of chattering, the respective vibrations may resonate. When the resonance is large, a tatami-like pattern appears on the polished surface to be mechanically polished due to the chattering. The pattern caused by the chattering is referred to as a chatter mark. This indicates that the polishing amount varies depending on the patterns, in other words, the polishing amount of the Cu—Ni—Sn based copper alloy foil varies. Here, the Cu—Ni—Sn based copper alloy foil has a lower thickness than that of the Cu—Ni—Sn based copper alloy sheet or strip, so that an effect of variation in the polishing amount is larger. That is, the buffing of the Cu—Ni—Sn based copper alloy foil results in increased variations. The use of the copper alloy foil as a spring leads to increased variations of spring characteristics, which is not preferable.

Therefore, it is difficult to polish mechanically the thinner Cu—Ni—Sn based copper alloy foil by means of the buff or the like, compared with the Cu—Ni—Sn based copper alloy sheet or strip.

In addition, recently, a lead-free solder has been widely used for health reasons, but the lead-free solder has poor solderability as compared with a lead-containing solder.

Therefore, it is undeniable that this may lead to decreased solderability of the thinner Cu—Ni—Sn based copper alloy foil, causing a problem that, in particular, solder wettability and solder adhesion required for manufacturing the autofocus camera module cannot be ensured.

Objects of the present invention are to solve the problems, and to provide a thinner Cu—Ni—Sn based copper alloy foil that has a foil thickness of 0.1 mm or less, has improved solder wettability and improved solder adhesion strength, and can be suitably used as a conductive spring material for use in electronic device parts such as autofocus camera modules; a copper rolled product; an electronic device part; and an autofocus camera module.

Means for Solving the Problem

As a result of intensive studies, the present inventors have found that a Cu—Ni—Sn based copper alloy foil having a foil thickness of 0.1 mm or less, obtained by adjusting a 60-degree glossiness $G60_{RD}$ on a surface as measured in a direction parallel to the rolling direction to a predetermined range, can still maintain good solder wettability and can exert high adhesion strength based on a so-called anchor effect.

Further, when producing the Cu—Ni—Sn based copper alloy foil, polishing with a buff is carried out in mechanical polishing after pickling performed before a final cold rolling. Therefore, polishing marks of the buff are formed on the material surface. Since the buffing marks remain without disappearing only by one pass rolling in the final cold rolling, the surface gloss is difficult to appear. It has been thus found that the controlling of glossiness by increasing the number of passes in the final cold rolling could achieve the 60-degrees glossiness $G60_{RD}$ within the predetermined range as described above.

Based on such findings, the present invention provides a Cu—Ni—Sn based copper alloy foil having a foil thickness of 0.1 mm or less, the Cu—Ni—Sn based copper alloy foil comprising: from 14% by mass to 22% by mass of Ni; and from 4% by mass to 10% by mass of Sn; the balance being Cu and inevitable impurities; and the Cu—Ni—Sn based copper alloy having a 60-degrees glossiness $G60_{RD}$ of from 200 to 600 on a surface as measured in a direction parallel to a rolling direction.

Here, it is preferable that the Cu—Ni—Sn based copper alloy foil according to the present invention has a tensile strength of 1100 MPa or more in the direction parallel to the rolling direction.

Further, the Cu—Ni—Sn based copper alloy foil according to the present invention has a total content of Mn, Ti, Si, Al, Zr, B, Zn, Nb, Fe, Co, Mg and Cr of from 0% by mass to 1.0% by mass.

The present invention further provides a copper rolled product comprising the Cu—Ni—Sn based copper alloy foil according to any one of the above copper foils.

The present invention further provides an electronic device part comprising the Cu—Ni—Sn based copper alloy foil according to any one of the above copper foils.

It is preferable that the electronic device part is an autofocus camera module.

The present invention further provides an autofocusing camera module comprising: a lens; a spring member for elastically biasing the lens to an initial position in an optical axis direction; and an electromagnetic driver configured to generate electromagnetic force for withstanding the biasing force of the spring member so that the lens can be driven in the optical axis direction, wherein the spring member comprises the Cu—Ni—Sn based copper alloy foil according to any one of the above copper foils.

Advantageous Effects of Invention

According to the present invention, a Cu—Ni—Sn based copper alloy foil having improved solderability and adhesion strength can be provided by adjusting a 60-degrees glossiness $G60_{RD}$ to a range of from 200 to 600 on a surface as measured in a direction parallel to a rolling direction. Such a Cu—Ni—Sn based copper alloy foil is particularly suitable for use in electronic device parts, in particular autofocus camera modules.

BRIEF DESCRIPTION OF DRAWINGS

FIG. 1 is a cross-sectional view showing an autofocus camera module according to one embodiment of the present invention.

FIG. 2 is an exploded perspective view of the autofocus camera module in FIG. 1.

FIG. 3 is a cross-sectional view showing the operation of the autofocus camera module in FIG. 1.

FIG. 4 is a graph showing an example of measurement results of a solder adhesive strength test in Examples.

DESCRIPTION OF THE PREFERRED EMBODIMENTS

Embodiments of the present invention will be described in detail below.

A Cu—Ni—Sn based copper alloy foil according to one embodiment of the present invention has a foil thickness of 0.1 mm or less; and contains from 14% by mass to 22% by mass of Ni, from 4% by mass to 10% by mass of Sn, the balance being copper and inevitable impurities; and has a 60-degrees glossiness $G60_{RD}$ of from 200 to 600 on a surface as measured in a direction parallel to a rolling direction.

(Ni Concentration)

The Cu—Ni—Sn based copper alloy foil according to the present invention has a Ni concentration of from 14% by mass to 22% by mass. Ni contributes to solute strengthening, precipitation strengthening, and improvement of strength due to spinodal decomposition by an aging treatment, in the alloy. Further, Ni ensures stress relaxation resistance and heat resistance (high strength maintainability at elevated temperature). If the Ni content is less than 14% by mass, the strength will not be improved during age hardening. On the other hand, if Ni is contained in an amount more than 22% by mass, a decrease in conductivity will become remarkable, which is not preferable in terms of cost. From this viewpoint, the Ni concentration is preferably from 14.5% by mass to 21.5% by mass, and more preferably from 15% by mass to 21% by mass.

(Sn Concentration)

The Cu—Ni—Sn based copper alloy foil according to the present invention has a Sn concentration of from 4% by mass to 10% by mass. Sn contributes to improvement of strength of the alloy due to spinodal decomposition by an aging treatment in the alloy without significantly decreasing the conductivity of the alloy. If the Sn content is less than 4% by mass, the spinodal decomposition will hardly occur. On the other hand, if Sn is contained in an amount more than 10% by mass, a low melting point composition will tend to be formed and segregation will be remarkable, so that workability is impaired. Therefore, the Sn concentration is preferably from 4.5% by mass to 9% by mass, and more preferably from 5% by mass to 8% by mass.

(Other Additive Elements)

The Cu—Ni—Sn based copper alloy foil according to the present invention may have a total content of Mn, Ti, Si, Al, Zr, B, Zn, Nb, Fe, Co, Mg and Cr of from 0% by mass to 1.0% by mass. When at least one element selected from the group consisting of Mn, Ti, Si, Al, Zr, B, Zn, Nb, Fe, Co, Mg and Cr is contained, an increase in strength can be expected due to solid solution in the matrix or formation of deposited particles. However, the total content of these elements may be 0% by mass, i.e., these elements may not be contained. The reason why the upper limit of the total content of these elements is 1.0% by mass is that the amount of more than 1.0% by mass cannot provide any further increase in the strength, as well as it will lead to degradation of workability and a material that is easily cracked during rolling.

The total content of Mn, Ti, Si, Al, Zr, B, Zn, Nb, Fe, Co, Mg and Cr may be typically from 0.05% by mass to 1.0% by mass, and more typically from 0.1% by mass to 1.0% by mass.

(Tensile Strength)

A tensile strength required for the Cu—Ni—Sn based copper alloy foil suitable as the conductive spring material for the autofocus camera module is 1100 MPa or more, and preferably 1200 MPa or more, and more preferably 1300 MPa or more. In the present invention, the tensile strength of the Cu—Ni—Sn based copper alloy foil was measured in a direction parallel to a rolling direction, and the tensile strength is measured in accordance with JIS Z2241-2011 (Metal Material Tensile Test Method).

(Glossiness)

The Cu—Ni—Sn based copper alloy foil according to the present invention has a 60-degrees glossiness $G60_{RD}$ of from 200 to 600 on the surface of the alloy as measured in the direction parallel to the rolling direction. This allows a required improved solder wettability to be ensured and adhesion strength by solder to be improved, which are advantageous for production of, in particular an autofocus camera module if the copper metal foil is used for the autofocus camera module.

It should be noted that a 60-degrees glossiness $G60_{TD}$ on the surface in a direction perpendicular to the rolling direction can be within a range equivalent to that of in the direction parallel to the rolling direction.

More particularly, as long as the 60-degrees glossiness $G60_{RD}$ is within the range of from 200 to 600, an actual surface area is not too large, so that the solder tends to wet and spread. Further, there are also moderate irregularities, so that adhesion of the solder is improved.

In other words, if the 60-degrees glossiness $G60_{RD}$ in the direction parallel to the rolling direction is less than 200, it will take much time to wet the solder, so that the solder wettability is poor. On the other hand, if the 60-degrees glossiness $G60_{RD}$ in the direction parallel to the rolling direction is more than 600, an anchor effect cannot be obtained, and the adhesion is poor.

From this viewpoint, the 60-degrees glossiness $G60_{RD}$ on the surface in the direction parallel to the rolling direction is more preferably from 300 to 580, and even more preferably from 480 to 580 μm.

The 60-degree glossiness $G60_{RD}$ can be determined by measuring glossiness at an incident angle of 60° in a direction parallel to the rolling direction, using various gloss meters such as a handy gloss meter PG-1 that is a gloss meter from NIPPON DENSHOKU INDUSTRIES Co., Ltd., in accordance with JIS Z8741.

(Thickness of Copper Alloy Foil)

The Cu—Ni—Sn based copper alloy foil according to the present invention has a foil thickness of 0.1 mm or less, and in a typical embodiment a foil thickness of from 0.018 mm to 0.08 mm, and in a more typical embodiment a foil thickness of from 0.02 mm to 0.05 mm.

(Producing Method)

As will be described below, the Cu—Ni—Sn based copper alloy foil according to the present invention can be produced by working processes that carries out melting, casting, homogenization annealing, hot rolling, cold rolling 1, a solution treatment, cold rolling 2, an aging treatment, chemical and mechanical polishing, cold rolling 3 and a rust prevention treatment in this order.

To produce the Cu—Ni—Sn based copper alloy foil according to the present invention, homogenization annealing should be carried out in order to eliminate segregation generated during solidification after melting and casting. If the homogenization annealing is not carried out, a surface shape of the final product will be affected and the hot workability of the ingot will be poor. For the homogenization annealing, for example, a temperature of 900° C. is maintained for 3 hours.

After the homogenization annealing, for example, hot rolling can be carried out at 800° C. with a degree of working of about 50%. However, the hot rolling may be omitted.

The subsequent cold rolling 1 is carried out in order to perform a solution treatment with a predetermined thickness. For the cold rolling 1, a higher degree of working is preferable in order to obtain fine crystal grains in the subsequent solution treatment, and for example, the degree of working may be about 90%.

The solution treatment should be carried out at or higher than a temperature at which second phase particles are not precipitated and at or lower a temperature at which liquid phase appears. Among such temperature ranges, a lower temperature of the solution treatment is more preferable, because it will not cause a decrease in strength, which will offset an increase in strength due to coarsening of crystal grains and development of a modulated structure. Specifically, the temperature of the solution treatment is, for example, from 720° C. to 850° C., and more preferably in a range of from solidus temperature to 800° C.

The cold rolling 2 is performed in order to increase strength before an aging treatment by introducing dislocation by rolling and also to increase strength after the aging treatment. Recrystallized grains obtained by the solution treatment in the cold rolling 2 are stretched.

To obtain the effect of increasing the strength as described above, the cold rolling 2 is preferably carried out at a rolling reduction rate (draft) of 55% or more, and more preferably 60% or more, and further preferably 65% or more. If the rolling reduction rate is less than 55%, it will be difficult to obtain a tensile strength of 1100 MPa or more. The upper limit of the rolling reduction rate is not particularly defined from the viewpoint of the strength intended by the present invention, but it does not industrially exceed 99.8%.

The cold rolling 2 is followed by an aging treatment. The aging treatment causes spinodal decomposition, so that a modulated structure is developed. The aging treatment is carried out at a temperature of from 350 to 500° C. for a heating time of from 3 minutes to 300 minutes. If the heating temperature is lower than 350° C., it will be difficult to obtain a tensile strength of 1100 MPa or more. If the temperature is higher than 500° C., precipitation will proceed and it will be difficult to obtain a tensile strength of 1100 MPa or more, and an oxide film will be excessively formed. If the heating time is less than 3 minutes or more than 300 minutes, it will be difficult to obtain a tensile strength of 1100 MPa or more.

After the aging treatment, chemical polishing and mechanical polishing on the surface are carried out in order to remove the oxide film or oxide layer formed on the surface. In the chemical polishing, a chemical polishing solution having extremely high corrosive power, such as a solution prepared by mixing hydrogen peroxide with hydrofluoric acid or sulfuric acid, can be used in order to remove the oxide film on the Cu—Ni—Sn based copper alloy foil, which is stable against an acid. The chemical polishing and mechanical polishing can be carried out under the same conditions as those of the prior art.

Buffing in the mechanical polishing leads to formation of polishing marks on the surface of the material. The polishing marks will decrease the glossiness of the product and cause deterioration of solder wettability and solder adhesion strength.

To address the problem it is effective to increase the number of passes in the rolling after achieving a predetermined foil thickness in the subsequent final cold rolling (cold rolling 3), because it can lead to improved glossiness of the Cu—Ni—Sn based copper alloy foil. In other words, if the rolling carried out with only one pass, the polishing marks due to the buffing do not disappear and the surface glossiness cannot be effectively increased. On the other hand, if the number of passes in the rolling is too large, the glossiness will become too high so that the glossiness exceeds 600, thereby deteriorating the solder adhesion.

Therefore, for example, when the rolling is carried out to a thickness of from 0.14 mm to 40 µm, the number of rolling passes in the final cold rolling is preferably from 8 to 24 passes, and further preferably from 12 to 24 passes, and even more preferably from 18 to 22 passes.

It is effective that the rolling with such a number of passes is carried out after the foil thickness reaches 0.14 mm.

Further, in the final cold rolling, the rolling is carried out, for example using a hard and smooth roll such as a chromium plated roll whose surface is plated with chromium, so that the surface of the roll is transferred to the material, thereby enabling smooth rolling.

Subsequently, a rust prevention treatment can be carried out. The rust prevention treatment can be carried out under the same conditions as those of the prior art, and an aqueous solution of benzotriazole (BTA) or the like can be used.

It should be noted that aging annealing may be carried out after the cold rolling 3 (final cold rolling).

(Application)

The Cu—Ni—Sn based copper foil according to the present invention can be suitably used in various applications, in particular as a material for electronic parts such as switches, connectors, jacks, terminals, and relays, and more particularly as a conductive spring member for use in electronic device parts such as autofocus camera modules.

For example, the autofocus module can include a lens; a spring member for elastically biasing the lens to an initial position in the optical axis direction; and an electromagnetic drive means configured to generate electromagnetic force for withstanding the biasing force of the spring member so that the lens can be driven in the optical axis direction. In this case, the spring member can be the Cu—Ni—Sn based copper alloy foil according to the present invention.

By way of example, the electromagnetic driving means can include a U-shaped cylindrical yoke; a coil housed inside an inner peripheral wall of the yoke, and a magnet enclosing the coil and housed inside the outer peripheral wall of the yoke.

FIG. 1 is a sectional view showing an example of the autofocus camera module according to the present invention, FIG. 2 is an exploded perspective view of the autofocus camera module in FIG. 1, and FIG. 3 is a cross-sectional view showing the operation of the autofocus camera module in FIG. 1.

An autofocus camera module 1 includes: a U-shaped cylindrical yoke 2; a magnet 4 attached to an outer wall of the yoke 2; a carrier 5 provided with a lens 3 in a central position; a coil 6 attached to the carrier 5; a base 7 to which the yoke 2 is attached; a frame 8 supporting the base 7; two spring members 9*a*, 9*b* for supporting the carrier 5 at the upper and lower positions; and two caps 10*a*, 10*b* covering these upper and lower positions. These two spring member 9*a*, 9*b* are the same articles, and support the carrier 5 by holding it from the upper and lower positions in the same positional relationship, while functioning as a power supply route to the coil 6. The carrier 5 moves upward by applying an electric current to the coil 6. It should be noted that the wordings "upper" and "lower" are used herein as needed, and they refer to upper and lower in FIG. 1 and the upper represents a positional relationship that is directed from the camera to a subject.

The yoke 2 is a magnetic material such as soft iron, and assumes a U-shaped cylindrical shape whose upper surface portion is closed, and has cylindrical inner wall 2*a* and outer wall 2*b*. A ring-shaped magnet 4 is attached (adhered) to the inner surface of the U-shaped outer wall 2*b*.

The carrier 5 is a formed product made of a synthetic resin or the like, which has a cylindrical structure with a bottom portion, and the carrier 5 supports the lens in the central position, and binds the pre-formed coil 6 onto the bottom surface outwardly so that the coil 6 is mounted thereon. The yoke 2 is integrated by fitting it to the inner periphery of the base 7 which is a rectangular resin formed article, and the whole yoke 2 is further secured by the frame 8 which is a resin formed article.

The spring members 9*a*, 9*b* are fixed by holding their outermost peripheral portions by the frame 8 and the base 7, respectively, and the cutout grooves arranged per 120° on the inner peripheral portion are fitted to the carrier 5 and fixed by thermal caulking or the like.

The spring member 9*b* and the base 7 as well as the spring member 9*a* and the frame 8 are fixed by adhesive and thermal caulking, respectively, and further the cap 10*b* is attached to the bottom surface of the base 7, and the cap 10*a* is attached to the upper portion of the frame 8, and the spring member 9*b* is sandwiched between the base 7 and the cap 10*b* and the spring member 9*a* is sandwiched between the frame 8 and the cap 10*a*, so that they are adhered.

The lead wire of one of the coils 6 is extended upward passing through the groove provided on the inner peripheral surface of the carrier 5, and soldered to the spring member 9*a*. The other lead wire is extended downward passing through the groove provided on the bottom surface of the carrier 5, and soldered to the spring member 9*b*.

The spring members 9*a*, 9*b* are plate springs made of the Cu—Ni—Sn based copper alloy foil according to the present invention. They have spring properties and elastically energize the lens 3 to the initial position in the optical axis direction. At the same time, they also act as power supply paths to the coil 6. One position on the outer peripheral portion of each of the spring members 9*a*, 9*b* projects outward, thereby acting as a power supply terminal.

The cylindrical magnet 4 is magnetized in the radial (diameter) direction and forms a magnetic path passing through the inner wall 2*a*, the upper surface portion and the outer wall 2*b* of the U-shaped yoke 2, and the coil 6 is disposed in the gap between the magnet 4 and the inner wall 2*a*.

The spring members 9*a*, 9*b* have the same shape, and are attached in the same positional relationship as shown in FIGS. 1 and 2, so that any axial deviation can be suppressed when the carrier 5 moves upward. Since the coil 6 is manufactured by pressure molding after winding, the accuracy of the finished outer diameter of the coil can be improved, thereby allowing the coil to be easily arranged in a predetermined narrow gap. The carrier 5 abuts to the base 7 at the lowest position and abuts to the yoke 2 at the uppermost position, and it will be thus equipped with the abutting mechanisms in the upper and bottom vertical direction, thereby preventing any detachment.

FIG. 3 shows a sectional view when upwardly moving the carrier 5 having the lens 3 for the autofocus, by applying an electric current to the coil 6. When an electric power is applied to the power supply terminals of the spring members 9*a*, 9*b*, the electric current flows through the coil 6, and an upward electromagnetic force acts on the carrier 5. On the other hand, restoring force of two linked spring members 9*a*, 9*b* downwardly acts on the carrier 5. Therefore, the distance of upward movement of the carrier 5 will correspond to a position where the electromagnetic force and the restoring force are balanced. This will allow determination of the moving amount of the carrier 5 according to the amount of the electric current applied to the coil 6.

Since the upper spring member 9*a* supports the upper surface of the carrier 5 and the lower spring member 9*b* support the lower surface of the carrier 5, the restoring force will equally work downward on the upper and lower surfaces of the carrier 5, so that any axial displacement of the lens 3 can be suppressed.

Therefore, for the upward movement of the carrier 5, no guide by a rib or the like is needed and used. Since there is no sliding friction by the guide, an amount of movement of the carrier 5 will be purely controlled by the balance between the electromagnetic force and the restoring force, thereby achieving smooth and accurate movement of the lens 3. This will achieve autofocusing with reduced blurring of the lens.

In addition, although the magnet 4 has been described as one having the cylindrical shape, the magnet is not limited to this shape, and may be divided into three to four parts and magnetized in the radial direction, which may be fixed by adhering to the inner surface of the outer wall 2*b* of the yoke 2.

EXAMPLES

The Cu—Ni—Sn based copper alloy foil according to the present invention was experimentally produced and its effects were confirmed as described below. However, the description herein is merely for the purpose of illustration and is not intended to be limited thereto.

<Production Conditions>

Production of prototype was carried out as follows. Electrolytic copper or oxygen-free copper as a main raw material and nickel (Ni) and tin (Sn) as sub-raw materials were melted in a high-frequency melting furnace in a vacuum or in an argon atmosphere to cast into a copper alloy ingot having a size of 45×45×90 mm and each composition shown in Table 1. Here, depending Inventive Examples or Comparative Examples, 25% Mn—Cu (Mn), 10% Fe—Cu (Fe), 10% Co—Cu (Co), zinc (Zn), Si, 10% Mg—Cu mother alloy (Mg), sponge titanium (Ti), sponge zirconium (Zr), and the like, were used as further sub-raw materials, so as to form each component shown in Table 1.

Each ingot as described above was subjected to homogenization annealing by maintaining the ingot at 900° C. for 3 h, followed by hot rolling at 800° C. with a degree of working of 50%, followed by cold rolling with a working degree of 90%, and followed by a solution treatment for heating the ingot at 1800° C. for 5 minutes. Each sample was then rapidly cooled by placing the sample in a water tank. Cold rolling 2 was then performed, where the rolling was carried out to a foil thickness of from 0.07 to 0.27 mm with a rolling reduction rate of from 88 to 97%. An aging treatment was then performed by heating the sample at 400° C. for 2 hours. Here, the temperature of the aging treatment was selected so as to maximize the tensile strength after the aging treatment.

After the aging treatment, chemical polishing for polishing the surface was carried out using a chemical polishing solution prepared by mixing hydrogen peroxide with sulfuric acid in order to remove the oxide film of Ni and Sn formed by the aging treatment, and mechanical polishing was then carried out using a buff roll in which a resin with dispersed SiC abrasive grains was fixed to sponge-like organic fibers.

After the mechanical polishing, cold rolling 3 (final cold rolling) was carried out to process the sample from a thickness of 0.14 mm (from 0.07 to 0.27 mm) to the product thickness with a degree of working of from 70% to 79%. In the cold rolling 3, the number of passes from a thickness of 0.14 mm was varied in each inventive example and comparative example, as shown in Table 1.

Each prototype thus obtained was evaluated as follows:
<Glossiness>

A 60-degree glossiness $G60_{RD}$ in the rolling parallel direction on the surface of each prototype was measured using a handy gloss meter PG-1, a gloss meter available from NIPPON DENSHOKU INDUSTRIES Co., Ltd, in accordance with JIS Z8741.

<Solder Wettability/Solder Adhesion>

A soldering test was carried out using solder of Pb-free solder M705 series from Senju Metal Industry Co., Ltd. In the evaluation of solder wettability, soldering was carried out by the same procedure as the meniscograph method with a solder checker (SAT-2000 available from REHSCA CO., LTD.) and appearance of the soldered portion was observed, in accordance with JIS C60068-2-54. The measurement conditions are as follows. The sample was degreased with acetone as a pretreatment. The sample was then pickled with an aqueous 10 vol % sulfuric acid solution. The solder test temperature was 245±5° C. The flux was not specified, but GX 5 available from Asahi Chemical Research Laboratory Co., Ltd. was used. Further, the immersion depth was 2 mm, the immersion time was 10 seconds, the immersion rate was 25 mm/sec, and the width of the sample was 10 mm. For evaluation criteria, each sample was evaluated by visual observation with a stereoscopic microscope at 20 magnitudes, and a sample in which the entire surface of the soldered portion was covered with the solder was evaluated as good (O), and a sample in which a part or all of the soldered portion was not covered with the solder was evaluated as poor (x). Further, in the evaluation of solder adhesion, a peel strength of 1 N or more was evaluated as O, and a peel strength of less than 1 N was evaluated as x. The peeling strength was measured by using a Cu—Ni—Sn based copper alloy foil having a plating layer and a pure copper foil (Alloy No. C1100 defined in JIS H3100 (2012); a foil thickness of from 0.02 mm to 0.05 mm) joined together via a lead-free solder (Sn-3.0 mass % Ag-0.5 mass % Cu). The Cu—Ni—Sn based copper alloy foil was in the form of a strip having a width of 15 mm and a length of 200 mm, the pure copper foil was in the form of a strip having a width of 20 mm and a length of 200 mm. A lead-free solder (a diameter of 0.4±0.02 mm, a length of 120±1 mm) was placed on an area of 30 mm×15 mm at each central portion in the long direction so as to be within the above area, and then joined together at a joining temperature of 245° C.±5° C. After the joining, the adhesion strength is measured by performing a 180° peeling test at a rate of 100 mm/min. An average value of loads (N) in a section of 40 mm from 30 mm to 70 mm of peeling displacement is determined to be the adhesion strength. An example of measurement results in the solder adhesion strength test is shown in FIG. 4.

These results are shown in Table 1

TABLE 1

| | Component (% by mass) | | | Prototype | | | | Tensile Strength (MPa) in |
|---|---|---|---|---|---|---|---|---|
| | Ni | Sn | Mn, Ti, Si, Al, Zr, B, Zr, Nb, Fe, Co, Si, Mg, Cr | Final Cold Rolling Number of Passes from Thickness of 0.14 mm | Product Thickness (mm) | 60-degree Glossiness $G60_{RD}$ | Spread of Solder Wetting | Solder Adhesion | Rolling Parallel Direction |
| Invention Example 1 | 15.0 | 8.0 | | 24 | 0.04 | 600 | o | o | 1350 |
| Invention Example 2 | 15.0 | 8.0 | | 8 | 0.04 | 200 | o | o | 1200 |
| Invention Example 3 | 15.0 | 8.0 | | 22 | 0.04 | 550 | o | o | 1280 |
| Invention Example 4 | 15.0 | 8.0 | | 20 | 0.04 | 500 | o | o | 1330 |
| Invention Example 5 | 15.0 | 8.0 | | 18 | 0.04 | 450 | o | o | 1220 |
| Invention Example 6 | 15.0 | 8.0 | | 16 | 0.04 | 400 | o | o | 1280 |
| Invention Example 7 | 15.0 | 8.0 | | 14 | 0.04 | 350 | o | o | 1210 |
| Invention Example 8 | 15.0 | 8.0 | | 12 | 0.04 | 300 | o | o | 1350 |
| Invention Example 9 | 15.0 | 8.0 | | 10 | 0.04 | 250 | o | o | 1280 |
| Invention Example 10 | 15.0 | 8.0 | | Number of Passes from Thickness 0.07 mm: 20 | 0.02 | 500 | o | o | 1420 |
| Invention Example 11 | 15.0 | 8.0 | | Number of Passes from Thickness 0.1 mm: 20 | 0.03 | 500 | o | o | 1360 |
| Invention Example 12 | 15.0 | 8.0 | | Number of Passes from Thickness 0.17 mm: 20 | 0.05 | 500 | o | o | 1320 |
| Invention Example 13 | 15.0 | 8.0 | | Number of Passes from Thickness 0.2 mm: 20 | 0.06 | 500 | o | o | 1280 |
| Invention Example 14 | 15.0 | 8.0 | | Number of Passes from Thickness 0.27 mm: 20 | 0.08 | 500 | o | o | 1250 |
| Invention Example 15 | 21.0 | 5.2 | | 20 | 0.04 | 500 | o | o | 1480 |
| Invention Example 16 | 22.0 | 10.0 | | 20 | 0.03 | 520 | o | o | 1520 |
| Invention Example 17 | 14.0 | 4.0 | | 20 | 0.04 | 500 | o | o | 1100 |
| Invention Example 18 | 15.0 | 8.0 | 0.2Fe | 20 | 0.04 | 500 | o | o | 1380 |
| Invention Example 19 | 15.0 | 8.0 | 0.1Fe, 0.1Ti | 20 | 0.04 | 500 | o | o | 1470 |
| Invention Example 20 | 15.0 | 8.0 | 0.1B, 0.4Cr, 0.4Ag | 20 | 0.04 | 500 | o | o | 1510 |
| Invention Example 21 | 15.0 | 8.0 | 0.1Mo, 0.05Si, 0.1Co | 20 | 0.04 | 500 | o | o | 1500 |
| Invention Example 22 | 15.0 | 8.0 | 0.1Mg, 0.1P | 20 | 0.04 | 500 | o | o | 1460 |
| Invention Example 23 | 15.0 | 8.0 | 0.1Mn, 0.1Ni, 0.2Zr | 20 | 0.04 | 500 | o | o | 1450 |
| Invention Example 24 | 15.0 | 8.0 | 0.2Al, 0.2Zn | 20 | 0.04 | 500 | o | o | 1370 |
| Invention Example 25 | 15.0 | 8.0 | 0.1Nb, 0.1Cr | 20 | 0.04 | 500 | o | o | 1380 |
| Comparative Example 1 | 15.0 | 8.0 | | 26 | 0.04 | 650 | o | x | 1350 |
| Comparative Example 2 | 15.0 | 8.0 | | 28 | 0.04 | 700 | o | x | 1340 |
| Comparative Example 3 | 15.0 | 8.0 | | 6 | 0.04 | 150 | x | o | 1350 |
| Comparative Example 4 | 15.0 | 8.0 | | 7 | 0.04 | 175 | x | o | 1350 |
| Comparative Example 5 | 10.0 | 3.0 | | 20 | 0.04 | 500 | o | o | 960 |
| Comparative Example 6 | 24.0 | 5.0 | | Cracking Occurred in Rolling | | | | | |
| Comparative Example 7 | 15.0 | 11.0 | | Cracking Occurred in Rolling | | | | | |
| Comparative Example 8 | 15.0 | 8.0 | 0.3Fe, 0.4Nb, 0.4Zn | Cracking Occurred in Rolling | | | | | |

As shown in Table 1, in all Invention Examples 1 to 25 where the number of passes from the predetermined foil thickness in the final cold rolling was set to the predetermined range, the 60-degree glossiness $G60_{RD}$ was within the preferable range, resulting in good spreading of solder wetting and good solder adhesion.

On the other hand, in Comparative Examples 1 and 2, the 60-degree glossiness $G60_{RD}$ was too high due to the excessive number of passes in the final cold rolling, so that the solder adhesion was deteriorated. In Comparative Examples 3 and 4, the number of passes in the final cold rolling was decreased, so that the 60-degree glossiness $G60_{RD}$ was decreased and the solder wettability was deteriorated. In Comparative Example 5, the Sn and Ni concentrations were too low, so that the tensile strength was decreased. In Comparative Examples 6 to 8, the concentration of Sn, Ni or the subcomponent was too high, so that cracking occurred during the rolling and the prototypes could not be produced.

In view of the foregoing, it was found that the present invention could improve the solder wettability and solder adhesion strength of the thinner Cu—Ni—Sn based copper alloy foil having a foil thickness of 0.1 mm or less.

DESCRIPTION OF REFERENCE NUMERALS

1 auto focus camera module
2 york
3 lens
4 magnet
5 carrier
6 coil
7 base
8 frame
9a upper spring member
9b lower spring member
10a, 10b cap

What is claimed is:

1. A Cu—Ni—Sn based copper alloy foil having a foil thickness of 0.1 mm or less, the Cu—Ni—Sn based copper alloy foil comprising: from 14% by mass to 22% by mass of Ni; and from 4% by mass to 10% by mass of Sn; the balance being Cu and inevitable impurities; and the Cu—Ni—Sn based copper alloy having a 60-degrees glossiness $G60_{RD}$ of from 200 to 600 on a surface as measured in a direction parallel to a rolling direction.

2. The Cu—Ni—Sn based copper alloy foil according to claim 1, wherein the Cu—Ni—Sn based copper alloy foil has a tensile strength of 1100 MPa or more in a direction parallel to the rolling direction.

3. The Cu—Ni—Sn based copper alloy foil according to claim 1, wherein the Cu—Ni—Sn based copper alloy foil has a total content of Mn, Ti, Si, Al, Zr, B, Zn, Nb, Fe, Co, Mg, and Cr of from 0% by mass to 1.0% by mass.

4. A copper rolled product comprising the Cu—Ni—Sn based copper alloy foil according to claim 1.

5. An electronic device part comprising the Cu—Ni—Sn based copper alloy foil according to claim 1.

6. The electronic device part according to claim 5, wherein the electronic device part is an autofocus camera module.

7. An autofocusing camera module comprising: a lens; a spring member for elastically biasing the lens to an initial position in an optical axis direction; and an electromagnetic driver configured to generate electromagnetic force for withstanding a biasing force of the spring member so that the lens can be driven in the optical axis direction, wherein the spring member comprises the Cu—Ni—Sn based copper alloy foil according to claim 1.

* * * * *